US007826790B2

(12) United States Patent
Li et al.

(10) Patent No.: US 7,826,790 B2
(45) Date of Patent: Nov. 2, 2010

(54) BROADCAST PLAYBACK METHOD AND BROADCAST PLAYBACK APPARATUS

(75) Inventors: De-Zhi Li, Shenzhen (CN); Yong-Jun Deng, Shenzhen (CN); Shih-Fang Wong, Taipei Hsien (TW)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 482 days.

(21) Appl. No.: 11/967,108

(22) Filed: Dec. 29, 2007

(65) Prior Publication Data

US 2008/0293354 A1 Nov. 27, 2008

(30) Foreign Application Priority Data

May 24, 2007 (CN) ........................ 2007 1 0200697

(51) Int. Cl.
*H04H 60/09* (2008.01)
*H04H 40/00* (2008.01)
*H04B 1/18* (2006.01)

(52) U.S. Cl. ................... 455/3.01; 455/3.06; 455/181.1

(58) Field of Classification Search ................ 455/3.01, 455/3.06, 344, 66.1, 3.04, 181.1
See application file for complete search history.

(56) References Cited

U.S. PATENT DOCUMENTS 5,557,541 A * 9/1996 Schulhof et al. .............. 700/94
6,286,063 B1 * 9/2001 Bolleman et al. ............. 710/62
6,968,364 B1 * 11/2005 Wong et al. ................. 725/135
7,224,811 B1 * 5/2007 Narusawa et al. ........... 381/119
7,343,141 B2 * 3/2008 Ellis et al. ................... 455/132
7,454,166 B2 * 11/2008 Patsiokas et al. ........... 455/3.06
7,559,074 B2 * 7/2009 Yamato et al. ................ 725/58
7,673,315 B1 * 3/2010 Wong et al. ................. 725/139
2005/0020223 A1 * 1/2005 Ellis et al. ................ 455/186.1

* cited by examiner

*Primary Examiner*—Tilahun Gesesse
(74) *Attorney, Agent, or Firm*—Frank R. Niranjan

(57) ABSTRACT

A broadcast playback system comprises a computer and a broadcast playback apparatus being connected to each other via a serial bus module. The computer loads predetermined control codes stored in the broadcast playback apparatus, performs the predetermined control codes to display a control menu. The broadcast playback apparatus plays a broadcasted program when receiving a play command generated by the computer according to a play input on the control menu. The broadcast playback apparatus stores the broadcasted program thereby generating a broadcast file when receiving a store command generated by the computer if a store input on the control menu. The broadcast playback apparatus replays a selected broadcast file when receiving a replay command generated by the computer according to a selection input of the selected broadcast file on the control menu. Moreover, a related broadcast playback method is further provided.

14 Claims, 4 Drawing Sheets

BROADCAST PLAYBACK METHOD AND BROADCAST PLAYBACK APPARATUS

BACKGROUND OF THE INVENTION

1. Field of the Invention

The present invention relates to a radio recorder, and especially to a broadcast playback method and a broadcast playback apparatus.

2. Description of Related Art

Radios are used for listening to broadcasted programs. Radios receive broadcasted signals of one of the broadcasted programs and reproduces audible sounds corresponding to the broadcasted signals.

Some computers are configured with radio functionality. Thus, users of the computer listen to the broadcasted programs wirelessly on top of listening to digital broadcasted programs via the Internet. The computer stores the broadcasted programs therein if being necessary and replays the stored broadcasted programs. However, the stored broadcasted programs cannot be convenient replayed by other computers.

Therefore, a heretofore unaddressed need exists in the industry to overcome the aforementioned deficiencies and inadequacies.

SUMMARY OF THE INVENTION

A broadcast playback method is provided. Using the broadcast playback method, a broadcast playback apparatus may store one or more broadcasted programs being played thereby generating one or more corresponding broadcast files under control of a computer and replay the broadcasted programs under control of any computer.

The broadcast playback method includes the steps of: the computer supplies power to the broadcast playback apparatus via a serial bus module; the broadcast playback apparatus sends predetermined control codes to the computer; the computer performs the predetermined control codes to display a control menu, displays a dialog box prompt to select an access path of a broadcasted program being played when a store icon on the control menu is activated and sends a store command to the broadcast playback apparatus when the access path of the broadcasted program is selected; the broadcast playback apparatus stores the broadcasted program being played thereby generating a broadcast file in response to the store command; the computer displays a dialog box prompt to select one of the broadcast files if a replay icon on the control menu is activated, and sends a replay command to the broadcast playback apparatus if the one of the broadcast files is selected; the broadcast playback apparatus reads the one of the selected broadcast file in response to the replay command, and replays the selected broadcast file.

Other advantages and novel features will become more apparent from the following detailed description of preferred embodiments when taken in conjunction with the accompanying drawings.

BRIEF DESCRIPTION OF THE DRAWINGS

The following detailed descriptions of exemplary and preferred embodiments are made with reference to the attached drawings.

DETAILED DESCRIPTION OF THE INVENTION

Figure 1:
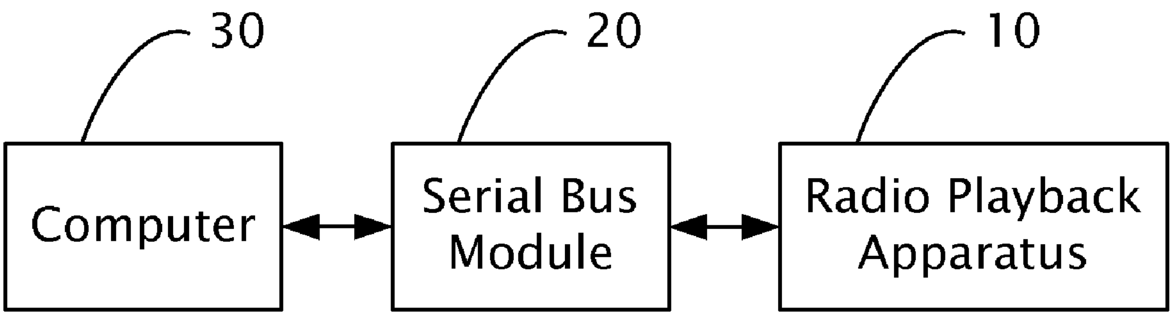
FIG. 1 is a schematic diagram of hardware infrastructure of a radio playback system.

FIG. 1 is a schematic diagram of hardware infrastructure of the radio playback system of the present invention. The radio playback system includes a detachable broadcast playback apparatus 10, a serial bus module 20, and a computer 30. The computer 30 is configured for displaying visual information on a display (not shown). The broadcast playback apparatus 10 and the computer 30 are connected to each other via a serial bus module 20. Via the serial bus module 20, the computer 30 supplies power to the broadcast playback apparatus 10 and exchanges data with the broadcast playback apparatus 10. The serial bus module 20 includes a universal serial bus (USB) module, a 1394 bus module, etc.

The broadcast playback apparatus 10 is configured for receiving analog broadcasted signals of one or more broadcasted programs being played and reproducing audible sounds corresponding to the analog broadcasted signals. The broadcast playback apparatus 10 is further configured for converting the analog broadcasted signals to generate digital broadcasted signals, compressing the digital broadcasted signals to generate compressed digital broadcasted signals, and storing the compressed digital broadcasted signals thereby generating one or more corresponding broadcast files.

Figure 3:
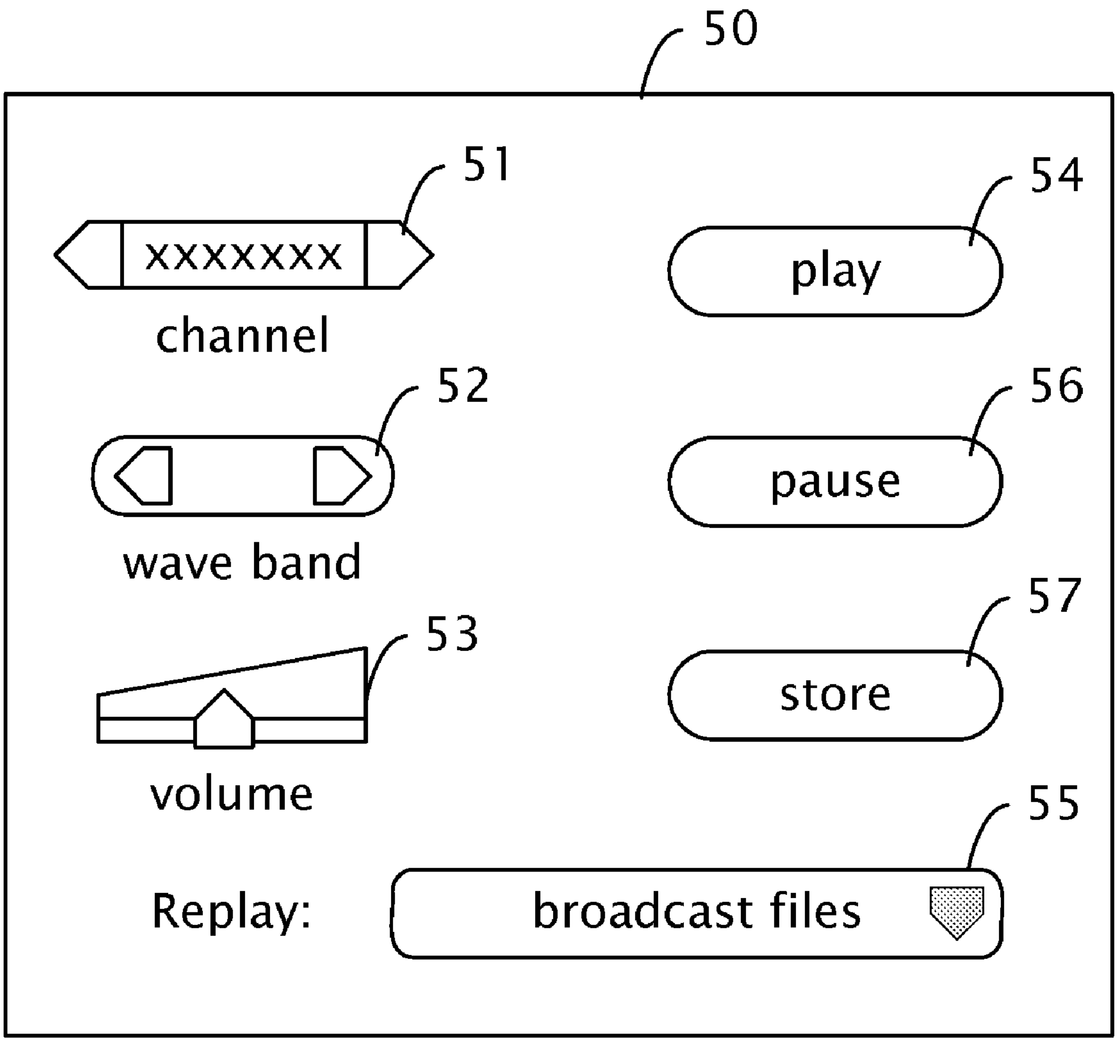
FIG. 3 is a schematic diagram of a control menu showing a plurality of selectable function icons.

The computer 30 is configured for controlling the broadcast playback apparatus 10. Referring to FIG. 3, when the broadcast playback apparatus 10 is connected to the computer 30 via the serial bus module 20, the computer 30 displays a control menu 50 on the display. The control menu 50 displays selectable function icons for controlling operations of the broadcast playback apparatus 10. The function icons includes a channel icon 51 for selecting a broadcasted program, a wave band icon 52 for selecting a wave band, a volume icon 53 for adjusting volume, a play icon 54 for playing a broadcasted program, a pause icon 55 for pausing the broadcasted program being played, a store icon 56 for storing the broadcasted program being played as a broadcast file, a pull-down menu 57 for selecting one of the broadcast files to be replayed.

The computer 30 generates commands in response to operational inputs of the function icons on the control menu 50, and sends the commands to the broadcast playback apparatus 10 via the USB module 20. In response to the commands, the broadcast playback apparatus 10 controls components thereof to perform particular actions.

Figure 2:
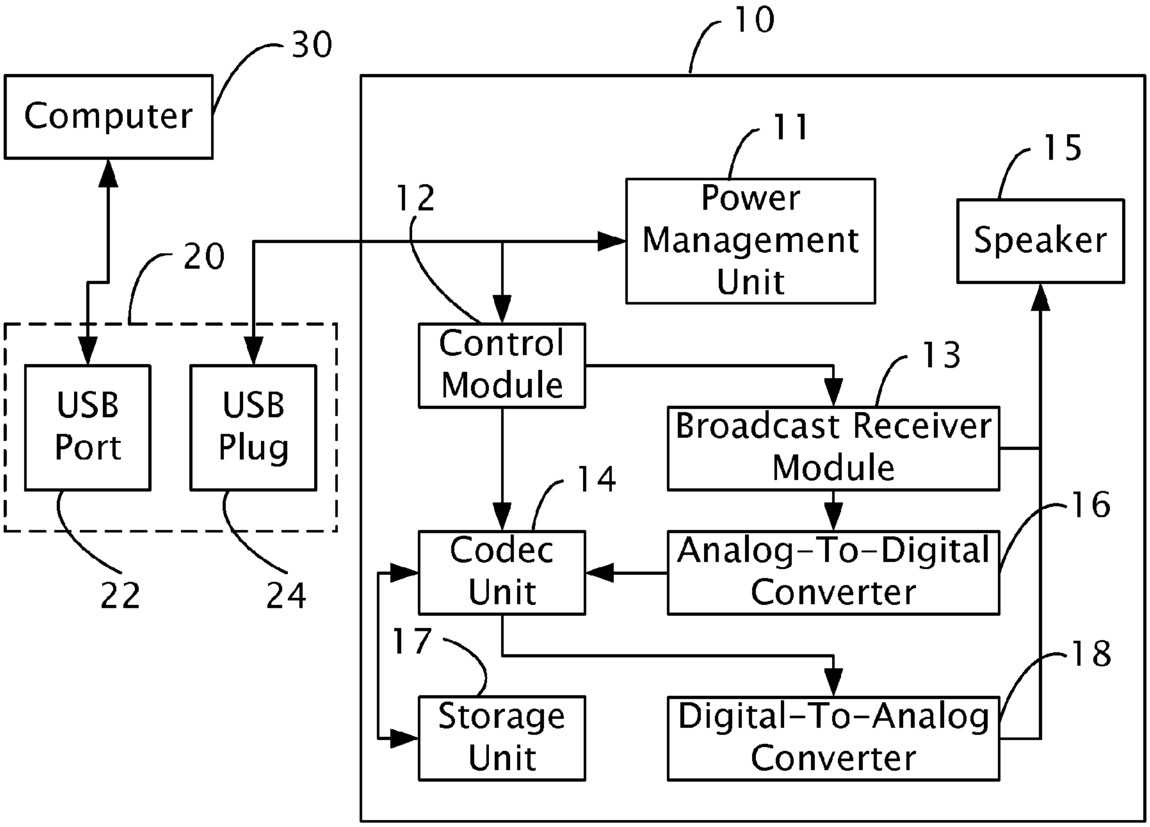
FIG. 2 is a block diagram of hardware infrastructure of the radio playback system according to an exemplary embodiment.

FIG. 2 is a block diagram of hardware infrastructure of the radio playback system according to an exemplary embodiment of the present invention. In the exemplary embodiment, the serial bus module 20 is illustrated as a USB module. The broadcast playback apparatus 10 is connected to the computer 30 via the USB module 20. The USB module 20 includes a USB port 22 and a USB plug 24, which are respectively mounted on the broadcast playback apparatus 10 and the computer 30. For example, the USB port 22 is mounted on the computer 30 and the USB plug 24 is accordingly mounted on the broadcast playback apparatus 10.

The broadcast playback apparatus 10 includes a power management unit 11, a control module 12, a broadcast receiver module 13, a codec unit 14, a speaker 15, an analog-to-digital converter 16, a storage unit 17, a digital-to-analog converter 18. The power management unit 11 and the control module 12 are respectively connected to the USB module 20.

The power management unit 11 receives the power supplied by the computer via the USB module 20, and outputs appropriate voltage signals to each component of the broadcast playback apparatus 10.

When the broadcast playback apparatus 10 is connected to the computer 30 via the USB module 20, i.e., the USB plug 24 is inserted into the USB port 22, the computer 30 initializes the broadcast playback apparatus 10. The control module 12 reads predetermined control codes stored in the storage unit 17 and sends the predetermined control codes to the computer 30. Referring to FIG. 3, the computer 30 performs the predetermined control codes and displays the control menu 50 on the display.

The computer 30 generates commands in response to operational inputs of the function icons on the control menu 50, and sends the commands to the control module 12 via the USB module 20. In response to the commands, the control module 12 controls the broadcast receiver module 13 and the codec unit 14 to perform the particular actions.

If the play icon 54 on the control menu 50 is activated, the computer 30 generates the play command and sends the play command to the control module 12 via the USB module 20. In response to the play command, the control module 12 controls the broadcast receiver module 13 to receive the analog broadcasted signals of the broadcasted program to be played modulate frequency and amplitude of the analog broadcasted signals, and to send the analog broadcasted signals to the speaker 15. The speaker 15 reproduces audible sounds corresponding to the analog broadcasted signals.

Figure 4:
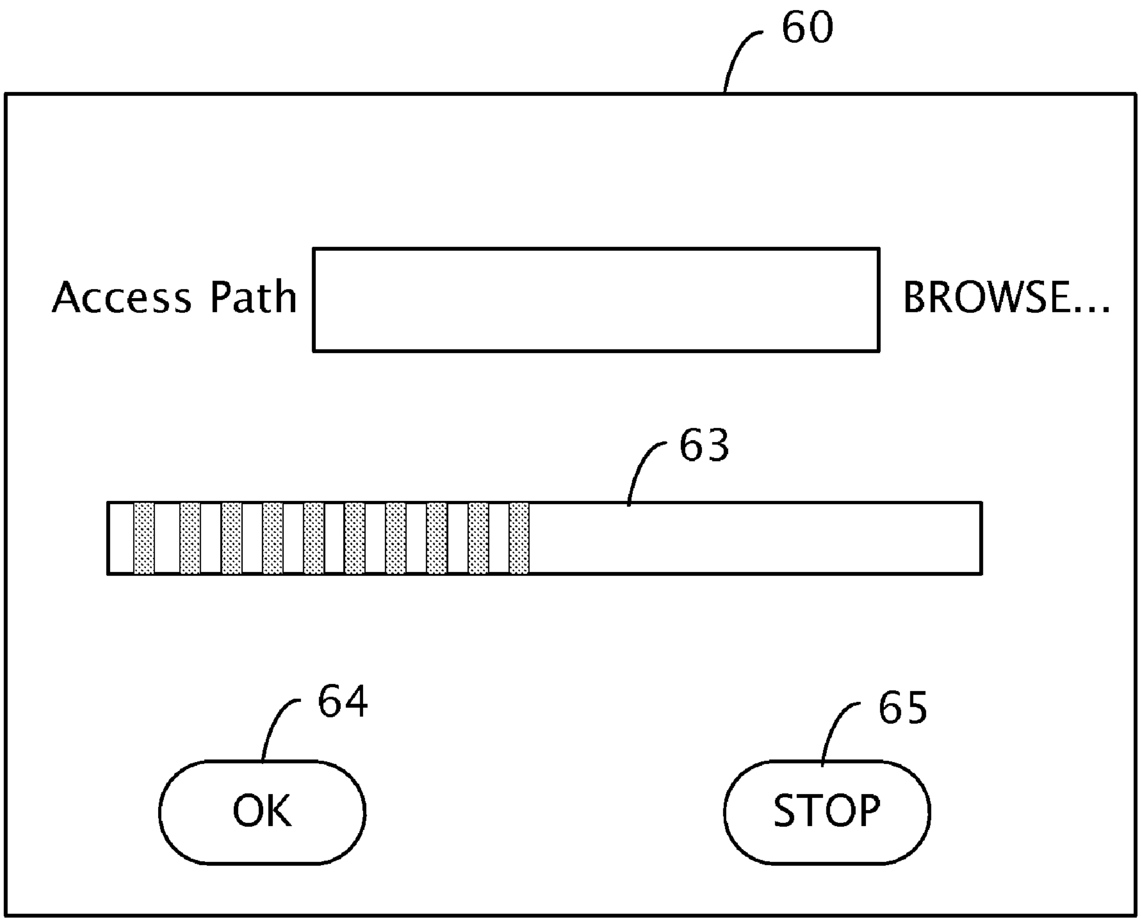
FIG. 4 is a schematic diagram of a dialog box prompt to select an access path of a broadcasted program to be stored.

Referring to FIG. 4, if the store icon 56 is activated in course of playing the broadcasted program, the computer 30 displays a dialog box 60 on the display. The dialog box 60 prompts a user to select an access path of the broadcasted program. After the access path is selected and an OK icon 64 on the dialog box 60 is activated, the computer 30 generates a store command and sends the store command to the control module 12 via the USB module 20. In response to the store command, the control module 12 controls the broadcast receiver module 13 to transmit the analog broadcasted signals to the analog-to-digital converter 16. The analog-to-digital converter 16 converts the analog broadcasted signals to generate the corresponding digital broadcasted signals. Under control of the control module 12, the codec unit 14 compresses the digital broadcasted signals to generate the compressed digital broadcasted signals, and stores the compressed digital broadcasted signals to the storage unit 17 thereby generating the broadcast file. Meanwhile, the control module 12 returns a feedback signal to the computer 30 via the USB module 20.

In response to the feedback signal, the computer 30 displays a state bar 63 indicating a store procedure of the broadcasted program. In course of storing the broadcasted program, if a stop icon 65 on the dialog box 60 is activated, the computer 30 generates a stop command and sends the stop command to the control module 12 via the USB module 20. In response to the stop command, the control module 12 controls the broadcast receiver module 13 to stop transmitting the analog broadcasted signals to the analog-to-digital converter 16 thereby the store procedure is stopped.

Referring to FIG. 3 again, the pull-down menu 55 prompts a user to select one of the broadcast files to be replayed. After one of the broadcast files is selected, the computer 30 generates a replay command and sends the replay command to the control module 12 via the USB module 20. In response to the replay command, the control module 12 controls the codec unit 14 to read the one of the broadcast files. The codec unit 14 decompresses the compressed digital broadcasted signals of the broadcast file to generate the decompressed digital broadcasted signals. The digital-to-analog converter 18 converts the decompressed digital broadcasted signals to generate the analog broadcasted signals. The speaker 15 reproduces audible sounds corresponding to the analog broadcasted signals.

In an alternative embodiment, the broadcast playback apparatus 10 further includes a battery. When the broadcast playback apparatus 10 is not connected to the computer 30, the battery can supply power to the power management unit 11, thereby the power management unit 11 outputs appropriate voltage signals to each component of the broadcast playback apparatus 10. In another embodiment, the broadcast playback apparatus 10 may further includes a charging unit. The charging unit may receive power supplied by the computer 30 and charge the battery.

It is understood that the invention may be embodied in various other forms without departing from the spirit thereof. Thus, the present examples and embodiments are to be considered in all respects as illustrative and not restrictive, and the invention is not to be limited to the detail given above.

What is claimed is:

1. A broadcast playback method comprising:

under control of a computer, supplying power to a broadcast playback apparatus via a serial bus module;

under control of a broadcast playback apparatus, sending predetermined control codes to the computer;

under control of the computer, performing the predetermined control codes to display a control menu;

displaying a dialog box prompt to select an access path of a broadcasted program being played when a store icon on the control menu is activated;

sending a store command to the broadcast playback apparatus when the access path of the broadcasted program is selected;

under control of the broadcast playback apparatus, storing the broadcasted program being played thereby generating a broadcast file in response to the store command;

under control of the computer, displaying a dialog box prompt to select one of the broadcast files if a replay icon on the control menu is activated;

sending a replay command to the broadcast playback apparatus if the one of the broadcast files is selected;

under control of the broadcast playback apparatus, reading the one of the selected broadcast file in response to the replay command; and replaying the selected broadcast file.

2. The broadcast playback method according to claim 1, wherein the step of storing the broadcasted program comprises:

under control of the broadcast playback apparatus, converting the analog broadcasted signals of the broadcasted program being played to generate corresponding digital broadcasted signals in response to the store command;

compressing the digital broadcasted signals to generate compressed digital broadcasted signals; and storing the compressed digital broadcasted signals thereby generating the broadcast file.

3. The broadcast playback method according to claim 1, wherein the step of replaying the broadcast file comprises:

decompressing the selected broadcast file to generate decompressed digital broadcasted signals;

converting the decompressed digital broadcasted signals to generate analog broadcasted signals; and reproducing audible sounds corresponding to the analog broadcasted signals.

4. The broadcast playback method according to claim 1, further comprising:

under control of the computer, sending a play command of the broadcasted program to the broadcast playback apparatus when a play icon on the control menu is activated; and under control of the broadcast playback apparatus, receiving analog broadcasted signals of the broadcasted program and reproducing audible sounds corresponding to the analog broadcasted signals.

5. The broadcast playback method according to claim 1, wherein the serial bus module comprises a port and a plug that is respectively mounted on the computer and the broadcast playback apparatus.

6. The broadcast playback method according to claim 5, wherein the serial bus module is selected from the group consisting of a universal serial bus module and a 1394 bus module.

7. A broadcast playback apparatus being connected to a computer via a serial bus module, wherein the broadcast playback apparatus comprises:

a broadcast receiver module for receiving analog broadcasted signals of a broadcasted program;

a speaker for reproducing audible sounds corresponding to the analog broadcasted signals;

a storage unit for storing predetermined control codes;

a control module for being powered by the computer via the serial bus module, reading the predetermined control codes from the storage unit and sending the predetermined control codes to the computer, wherein the predetermined control codes is performed by the computer to display a control menu on which a store icon is activated to send a store command to the control module;

an analog-to-digital converter for receiving the analog broadcasted signals transmitted from the broadcast receiver module under control of the control module, and converting the analog broadcasted signals to generate digital broadcasted signals;

a codec unit for compressing the digital broadcasted signals to generate compressed digital broadcasted signals, and storing the compressed digital broadcasted signals in the storage unit thereby generating a broadcast file;

wherein the control module further receives a replay command generated by the computer when one of the broadcast files on the control menu is selected;

the codec unit reads the broadcast file under control of the control module, and decompressing the compressed digital broadcasted signals of the broadcast file to generate decompressed digital broadcasted signals; and the digital-to-analog converter converts the decompressed digital broadcasted signals to generate analog broadcasted signals and sends the analog broadcasted signals to the speaker.

8. The broadcast playback apparatus according to claim 7, wherein:

the control module further receives a play command of the broadcasted program generated by the computer when a play icon on the control menu is activated; and the broadcast receiver module receives the analog broadcasted signals of the broadcasted program under control of the control module, and transmits the analog broadcasted signals to the speaker.

9. The broadcast playback apparatus according to claim 7, wherein the serial bus module comprises a port and a plug that is respectively mounted on the computer and the broadcast playback apparatus.

10. The broadcast playback apparatus according to claim 9, wherein the serial bus module is selected from the group consisting of a universal serial bus module and a 1394 bus module.

11. A computer being connected to a broadcast playback apparatus via a serial bus module, wherein:

the computer supplies power to the broadcast playback apparatus via the serial bus module, receives predetermined control codes transmitted by the broadcast playback apparatus, performs the predetermined control codes to display a control menu, displays a dialog box prompt to select an access path of a broadcasted program being played when a store icon on the control menu is activated, sends a store command to the broadcast playback apparatus when the access path of the broadcasted program is selected, wherein the store command is for signaling the broadcast playback apparatus to store the broadcasted program thereby generating a broadcast file; and the computer further sends a replay command to the broadcast playback apparatus when one of the broadcast files is selected, wherein the replay command is for signaling the broadcast playback apparatus to replay one of the broadcast files.

12. The computer according to claim 11, wherein the computer further sends a play command of the broadcasted program when a play icon on the control menu is activated, and the play command is for signaling the broadcast playback apparatus to play the broadcasted program.

13. The computer according to claim 1, wherein the serial bus module comprises a port and a plug that is respectively mounted on the computer and the broadcast playback apparatus.

14. The computer according to claim 13, wherein the serial bus module is selected from the group consisting of a universal serial bus module and a 1394 bus module.

* * * * *